United States Patent
Sugiura

(10) Patent No.: US 9,987,769 B2
(45) Date of Patent: Jun. 5, 2018

(54) MOLD

(71) Applicant: TOYOTA JIDOSHA KABUSHIKI KAISHA, Toyota-shi (JP)

(72) Inventor: Naoaki Sugiura, Takahama (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 287 days.

(21) Appl. No.: 14/797,868

(22) Filed: Jul. 13, 2015

(65) Prior Publication Data

US 2016/0031121 A1  Feb. 4, 2016

(30) Foreign Application Priority Data

Jul. 30, 2014 (JP) .................. 2014-155437

(51) Int. Cl.
| | |
|---|---|
| *B29C 33/02* | (2006.01) |
| *B29C 33/38* | (2006.01) |
| *B33Y 80/00* | (2015.01) |
| *B29L 31/00* | (2006.01) |
| *B29C 33/42* | (2006.01) |

(52) U.S. Cl.
CPC .......... *B29C 33/02* (2013.01); *B29C 33/3828* (2013.01); *B29C 33/3835* (2013.01); *B29C 33/424* (2013.01); *B29C 2033/023* (2013.01); *B29L 2031/772* (2013.01); *B33Y 80/00* (2014.12)

(58) Field of Classification Search
CPC .............. B29C 33/02; B29C 33/3828; B29C 2033/023; B33Y 80/00
See application file for complete search history.

(56) References Cited

U.S. PATENT DOCUMENTS

2005/0038551 A1* 2/2005 Mazumder ............ B22F 3/1055
700/166

FOREIGN PATENT DOCUMENTS

| CN | 103587005 A | 2/2014 |
|---|---|---|
| DE | 26 46 060 A1 | 4/1978 |
| DE | 199 37 315 A1 | 2/2001 |
| DE | 10 2005 030 678 A1 | 1/2007 |
| JP | 2-307635 A | 12/1990 |
| JP | 2000-5845 A | 1/2000 |
| JP | 2002-249805 A | 9/2002 |
| JP | 2013-35204 A | 2/2013 |
| JP | 2013-199010 A | 10/2013 |

* cited by examiner

*Primary Examiner* — James Sanders
(74) *Attorney, Agent, or Firm* — Oblon, McClelland, Maier & Neustadt, L.L.P.

(57) ABSTRACT

A mold capable of inhibiting supercooling is provided. The mold includes a cooling channel formed therein and has a recess formed in a cavity surface, and a heat-insulating barrier formed between the cooling channel and a bottom surface of the recess formed in the cavity surface. The heat-insulating barrier includes a space formed between the cooling channel and the bottom surface of the recess formed in the cavity surface. The space is filled with a medium (for example, air) having a thermal conductivity lower than that of other portions of the mold.

3 Claims, 4 Drawing Sheets

MOLD

INCORPORATION BY REFERENCE

This application is based upon and claims the benefit of priority from Japanese patent application No. 2014-155437, filed on Jul. 30, 2014, the disclosure of which is incorporated herein in its entirety by reference.

BACKGROUND OF THE INVENTION

1. Field of the Invention

The present invention relates to a mold. More specifically, the present invention relates to, for example, a mold which includes a cooling channel formed therein and has a recess formed in a cavity surface.

2. Description of Related Art

In resin molding or cast molding, material to be filled in a cavity portion between molds facing each other is cooled and solidified by removing heat from the material. In general, each mold used for resin molding or cast molding has a cooling function.

For example, a mold disclosed in Japanese Unexamined Patent Application Publication No. 2013-199010 has a structure in which a cooling channel is formed in the mold and cooling water is supplied through the cooling channel, to thereby cool the mold.

In order to keep down the manufacturing cost of a mold, it is necessary to reduce the volume of the mold (mold volume). However, if the cooling channel is formed in the mold with a limited mold volume, the cooling channel is inevitably disposed in the vicinity of a cavity surface. Especially, when the cavity surface has a convex-concave shape, the interval between the cooling channel and the bottom surface of a recess formed in the cavity surface is small, so that a portion of the mold in the vicinity of the bottom surface of the recess is supercooled in some cases.

SUMMARY OF THE INVENTION

The present invention has been made in view of the above-mentioned circumstances, and an object of the present invention is to provide a mold capable of inhibiting supercooling.

An exemplary aspect of the present invention is a mold that includes a cooling channel formed therein and has a recess formed in a cavity surface, the mold including: a heat-insulating barrier formed between the cooling channel and a bottom surface of the recess formed in the cavity surface. The heat-insulating barrier includes a space formed between the cooling channel and the bottom surface of the recess formed in the cavity surface. The space is filled with a medium having a thermal conductivity lower than that of other portions of the mold.

This structure makes it possible to inhibit supercooling in the vicinity of the bottom surface of the recess formed in the cavity surface.

According to the exemplary aspect of the present invention, it is preferable that the mold be formed by additive manufacturing.

This facilitates formation of the cooling channel along the cavity surface and formation of the heat-insulating barrier.

According to the present invention, it is possible to provide a mold capable of inhibiting supercooling.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Specific exemplary embodiments of the present invention will be described in detail below with reference to the drawings. However, the present invention is not limited to the following exemplary embodiments. For clarity of explanation, the following description and the drawings are simplified as appropriate.

Figure 1:
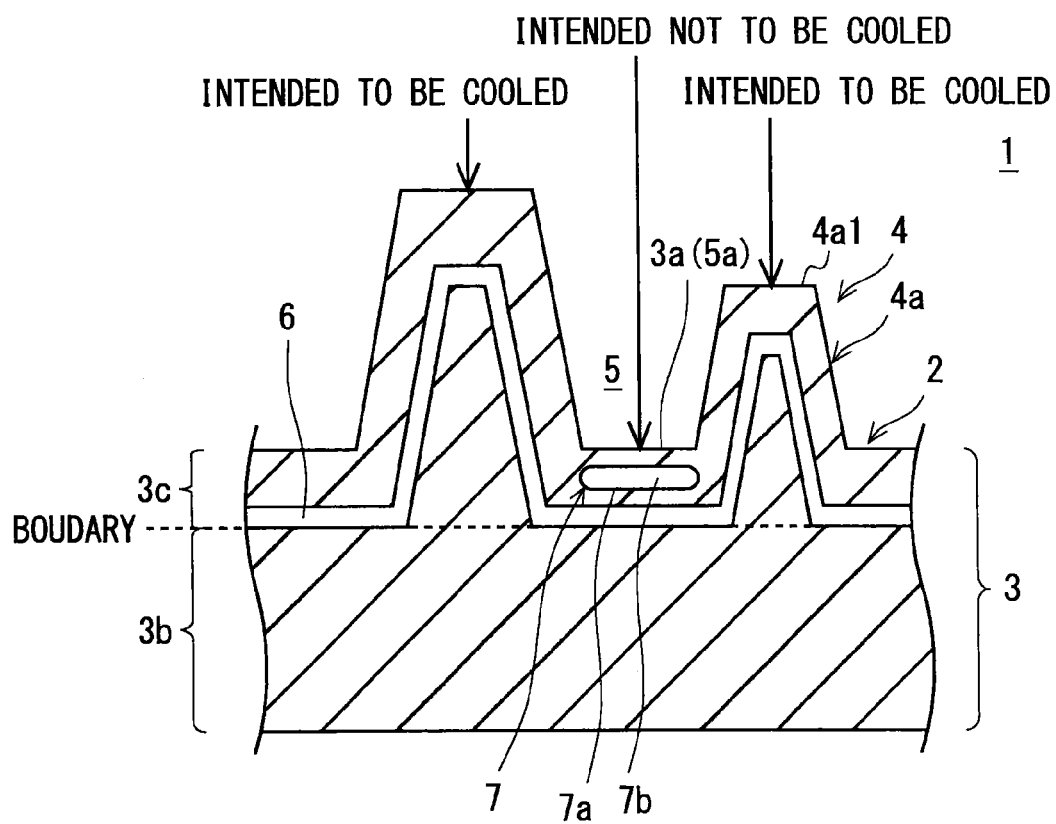
FIG. 1 is a sectional view schematically showing a mold according to an exemplary embodiment.
Figure 2:
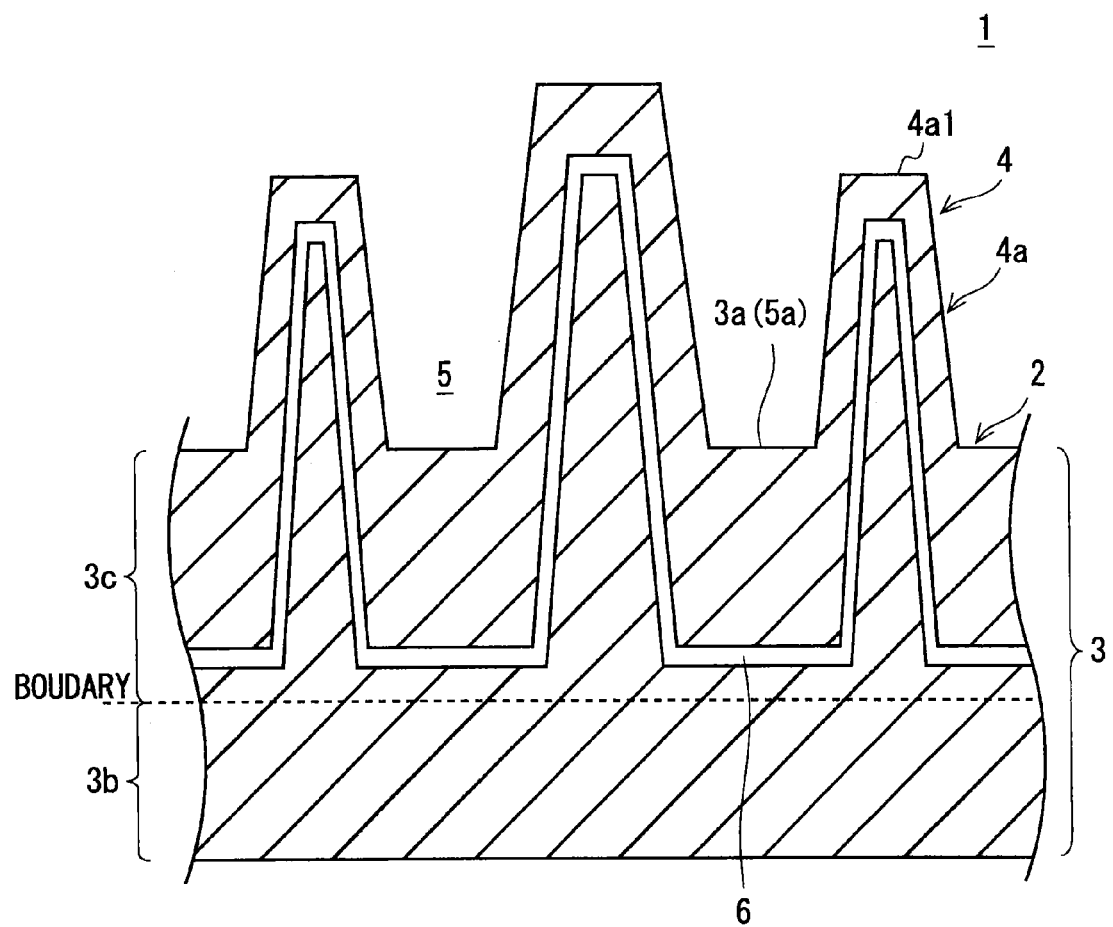
FIG. 2 is a sectional view schematically showing a mold having a structure in which a cooling channel is disposed at a position apart from a bottom surface of a recess formed in a cavity surface.

First, the structure of a mold according to an exemplary embodiment of the present invention will be described. FIG. 1 is a sectional view schematically showing a mold according to an exemplary embodiment of the present invention. FIG. 2 is a sectional view schematically showing a mold having a structure in which a cooling channel is disposed at a position apart from a bottom surface of a recess formed in a cavity surface.

A mold 1 according to an exemplary embodiment of the present invention is a mold used for resin molding or cast molding. As shown in FIG. 1, a surface of the mold 1 that faces another mold (not shown), which faces the mold 1 during molding, is referred to as a cavity surface 2. The mold 1 includes a plurality of protrusions 4 that protrude from a base portion 3.

Thus, the cavity surface 2 has a convex-concave shape, and includes a surface 3a of the base portion 3 that faces another mold during molding, and a surface 4a of each protrusion 4. In other words, each protrusion 4 projects from the surface 3. A recess 5 is recessed from a top surface 4a1 of each protrusion 4 and the surface 3a of the base portion 3 serves as a bottom surface 5a of the recess 5. In this case, the bottom surface 5a of the recess 5 is a bottom surface of a region that is lower than the top surface 4a1 of each protrusion 4.

In the mold 1 having the structure as described above, a cooling channel 6 is disposed in the vicinity of the cavity surface 2 so as to reduce the mold volume and improve the cooling efficiency of the mold 1, and a cooling medium, such as cooling water, is supplied through the cooling channel 6. With this structure, material can be cooled and solidified by efficiently removing heat from the material during molding, while the mold volume is reduced. The cooling channel 6 according to this exemplary embodiment is disposed along the cavity surface 2 at substantially the same distance from the cavity surface 2. However, the interval between the cavity surface 2 and the cooling channel 6 can be changed as needed. The interval may be changed at a certain point.

However, when the cooling channel 6 is disposed in the vicinity of the cavity surface 2 as described above, not only a portion of the mold that is intended to be cooled, but also a portion of the mold that is not intended to be cooled is cooled, which causes this portion to be supercooled. Especially, it is preferred that a portion of the mold in the vicinity of the surface 3a of the base portion 3 not be supercooled so that the material can be spread over the vicinity of the base of each protrusion 4 during molding and a release agent remaining on the bottom of the recess 5 can be evaporated.

Accordingly, the mold 1 according to this exemplary embodiment includes a heat-insulating barrier 7 which is formed between the cooling channel 6 and the surface 3a of the base portion 3 (i.e., between the cooling channel 6 and the bottom surface 5a of the recess 5 in the cavity surface 2) to prevent the cold from the cooling channel 6 from propagating to the bottom surface 5a of the recess 5.

The heat-insulating barrier 7 includes a space 7a which is formed between the cooling channel 6 and the bottom surface 5a of the recess 5 in the cavity surface 2. The space 7a is filled with air 7b having a thermal conductivity lower than that of other portions (i.e., metal portions solidified after melting to form the mold 1) of the mold 1. Although the space 7a is filled with the air 7b in this exemplary embodiment, the space 7a may be filled with any medium having a thermal conductivity lower than that of other portions of the mold 1. In other words, it is only necessary that the heat-insulating barrier 7 be formed so as to have a thermal conductivity lower than that of the portions other than the heat-insulating barrier 7 in the mold 1.

In this manner, the mold 1 according to this exemplary embodiment includes the heat-insulating barrier 7 between the cooling channel 6 and the bottom surface 5a of the recess 5 in the cavity surface 2, which makes it possible to inhibit supercooling in the vicinity of the bottom surface 5a of the recess 5. Accordingly, the material can be favorably spread over the bottom of the recess 5 during molding, and in addition, the release agent remaining on the bottom of the recess 5 can be favorably evaporated.

Furthermore, as compared with a case where the cooling channel 6 is disposed at a position apart from the bottom surface 5a of the recess 5 as shown in FIG. 2 so as to inhibit supercooling in the vicinity of the bottom surface 5a of the recess 5, the mold 1 can be downsized and the path of the cooling channel 6 can be simplified. This makes it possible to keep down the manufacturing cost of the mold 1.

In this case, the mold 1 is preferably formed by additive manufacturing. For example, a metal powder layer is formed on a bottom portion 3b, which constitutes a part of the base portion 3, and is irradiated with a laser beam to thereby melt and solidify the metal powder at a desired position. Then, a remaining portion 3c of the base portion 3 and the protrusions 4 are formed on the bottom portion 3b by repeatedly performing a process in which another metal powder layer is formed on a metal layer, which includes a portion where metal powder is solidified at a desired position and a portion where metal powder is not solidified, and is irradiated with a laser beam to thereby melt and solidify the metal powder at a desired position, thereby obtaining the mold 1 having the structure as described above.

This structure facilitates formation of the cooling channel 6 along the cavity surface 2 and formation of the heat-insulating barrier 7. Furthermore, an increase in cost and an increase in formation time in accordance with an increase in mold volume are remarkable in the additive manufacturing, as compared with a case where a mold is formed by shaving, for example. Accordingly, the benefits due to a reduction in the mold volume of the mold 1 as described above are large.

When the cooling channel 6 is disposed at a position apart from the bottom surface 5a of the recess 5 as shown in FIG. 2, the mold volume of a laminated portion increases as the height of the laminated portion increases, so that the amount of metal powder to be used increases. In this exemplary embodiment, however, the mold volume of the mold 1 can be reduced as described above. Accordingly, the amount of metal powder to be used can be reduced, and thus the manufacturing cost of the mold 1 can be kept down.

It is preferable that a hole (not shown) that communicates with the space 7a be formed to remove the metal powder, which is filled in the space 7a during additive manufacturing of the mold 1, through the hole. However, the metal powder can be left in the space 7a. This is because, even if the metal powder remains in the space, the thermal conductivity of the heat-insulating barrier 7 is lower than that in the state where the space 7a is filled with metal solidified after melting thereof.

Figure 3:
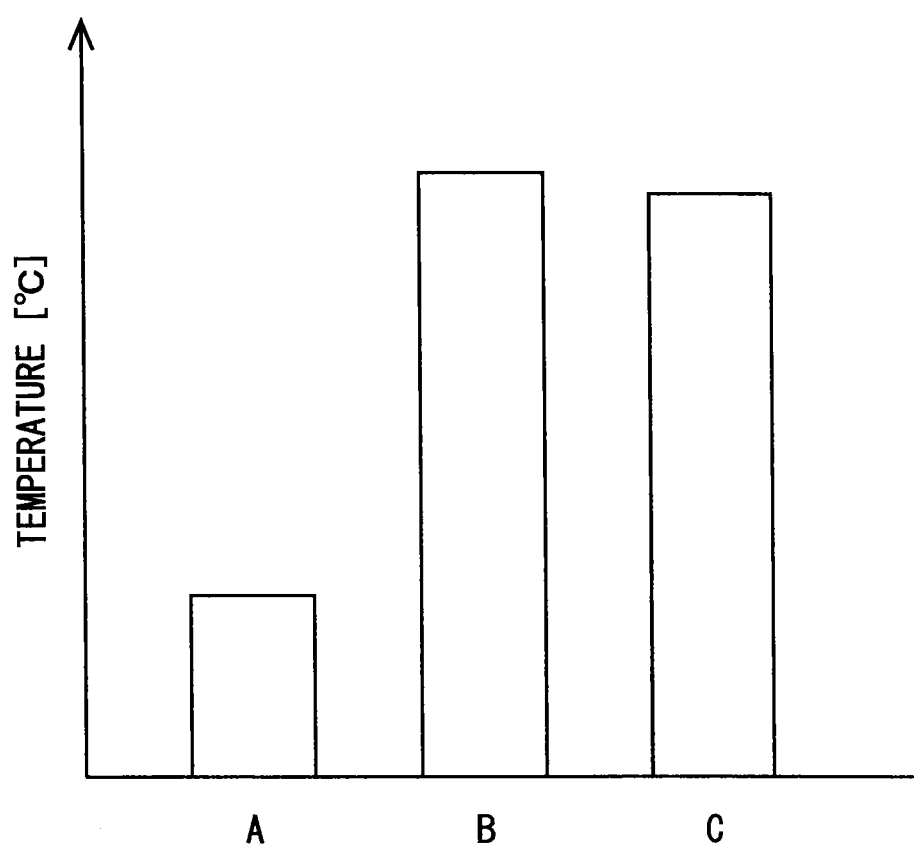
FIG. 3 is a graph showing a supercooling inhibiting effect of the mold according to the exemplary embodiment.

Next, the supercooling inhibiting effect of the mold according to this exemplary embodiment will be described. FIG. 3 is a graph showing the supercooling inhibiting effect of the mold according to this exemplary embodiment. A mold ("A" in FIG. 3) having a structure in which the cooling channel is disposed in the vicinity of the cavity surface, a mold ("B" in FIG. 3) having a structure in which the cooling channel is disposed at a position (10 mm) apart from the bottom surface of the recess in the cavity surface, and the mold 1 ("C" in FIG. 3) of this exemplary embodiment were prepared as molds to be compared with each other, and the temperature of the bottom surface of the recess in the cavity surface of each mold was measured.

As shown in FIG. 3, the mold 1 according to this exemplary embodiment can obtain a supercooling inhibiting effect that is substantially the same as that of the mold having a structure in which the cooling channel is disposed at a position (10 mm) apart from the bottom surface of the recess in the cavity surface.

Figure 4:
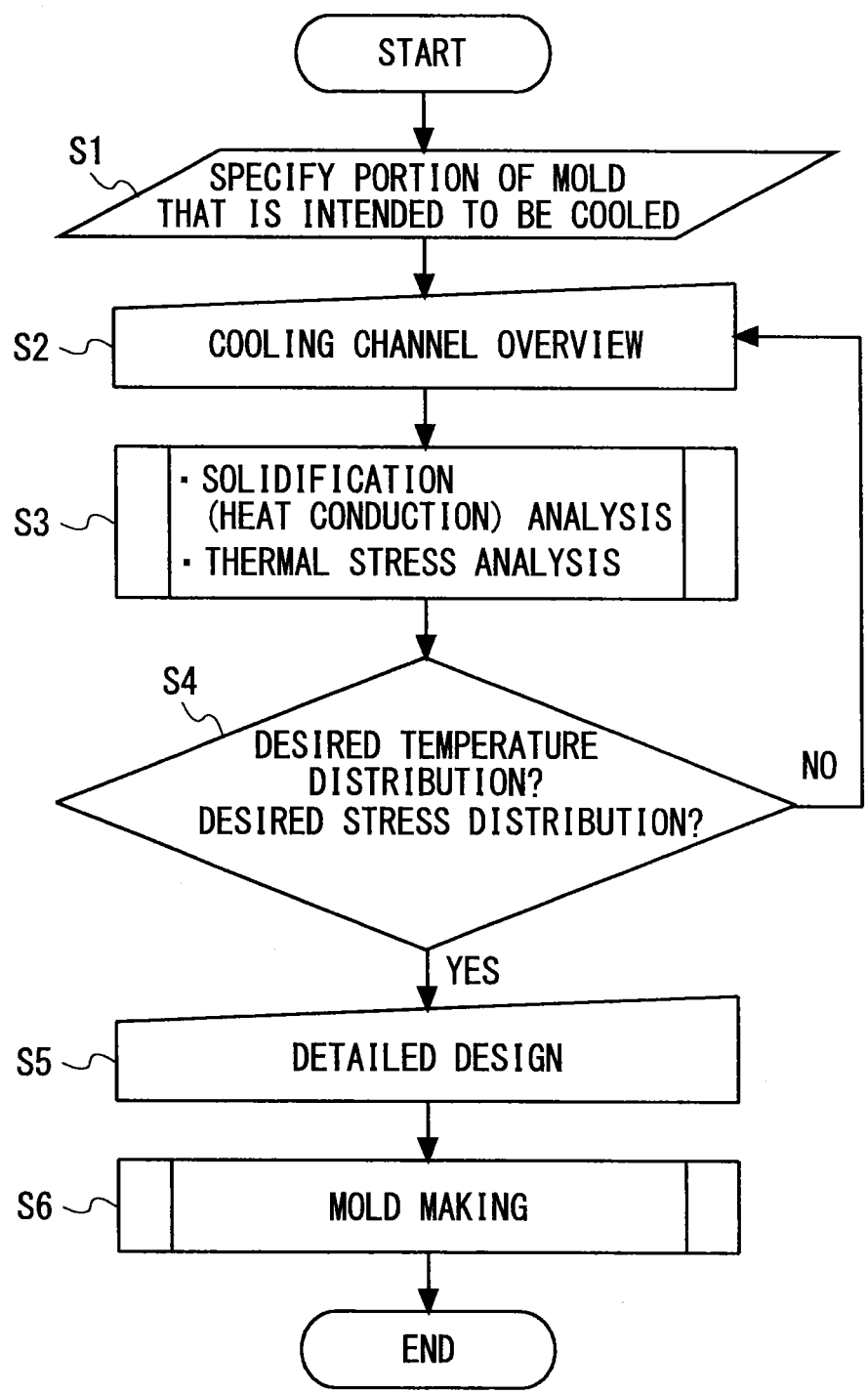
FIG. 4 is a design flow chart of a mold according to an exemplary embodiment.

Next, a method for designing the mold according to this exemplary embodiment will be described. FIG. 4 is a design flow chart of the mold according to this exemplary embodiment. The following mold design method can be implemented by causing, for example, a computer to execute a program. First, a portion of the mold that is intended to be cooled is specified by the computer based on information about, for example, the shape of the mold and the material to be molded (S1).

Next, the computer derives the layout of the heat-insulating barrier and the path of the cooling channel in the mold based on information about the specified portion of the mold that is intended to be cooled (S2). Then, the computer analyzes the state in which the material is solidified, i.e., the heat conduction of the material, during molding of the material using the mold for which the derived layout of the heat-insulating barrier and the path of the cooling channel is adopted, and also analyzes a thermal stress generated in the mold (S3).

Next, the computer determines whether the heat conduction of the material is appropriate or not, and also determines whether the thermal stress generated in the mold is appropriate or not. When the heat conduction of the material and the thermal stress generated in the mold are not appropriate (NO in S4), the process returns to step S2, and the computer derives the layout of the heat-insulating barrier and the path of the cooling channel.

On the other hand, when the heat conduction of the material and the thermal stress generated in the mold are appropriate (YES in S4), the computer conducts a detailed designing (for example, designing in association with another mold), and controls an additive manufacturing apparatus, for example, on the basis of coordinate data on the detailed design, thereby forming the mold (S5).

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A mold that includes a cooling channel formed therein and has a recess formed in a cavity surface, the mold comprising:
    a heat-insulating barrier formed between the cooling channel and a bottom surface of the recess formed in the cavity surface, wherein
    the cooling channel is disposed along protrusions and the recess in the cavity surface,
    the heat-insulating barrier includes a space formed between the cooling channel and the bottom surface of the recess formed in the cavity surface, and
    the space is filled with a medium having a thermal conductivity lower than that of other portions of the mold.

2. The mold according to claim 1, wherein the mold is formed by additive manufacturing.

3. The mold according to claim 1, wherein the medium is air.

* * * * *